United States Patent
Scheben et al.

(10) Patent No.: US 8,844,357 B2
(45) Date of Patent: Sep. 30, 2014

(54) YAW-RATE SENSOR AND METHOD FOR OPERATING A YAW-RATE SENSOR

(75) Inventors: Rolf Scheben, Stuttgart (DE); Burkhard Kuhlmann, Reutlingen (DE); Thorsten Balslink, Kirchentellinsfurt (DE); Daniel Christoph Meisel, Vaihingen an der Enz (DE); Benjamin Schmidt, Stuttgart (DE)

(73) Assignee: Robert Bosch GmbH, Stuttgart (DE)

( * ) Notice: Subject to any disclaimer, the term of this patent is extended or adjusted under 35 U.S.C. 154(b) by 287 days.

(21) Appl. No.: 13/294,752

(22) Filed: Nov. 11, 2011

(65) Prior Publication Data

US 2012/0125099 A1 May 24, 2012

(30) Foreign Application Priority Data

Nov. 23, 2010 (DE) .......................... 10 2010 061 755

(51) Int. Cl.
*G01C 19/56* (2012.01)
*G01C 19/5747* (2012.01)

(52) U.S. Cl.
CPC .................. *G01C 19/5747* (2013.01)
USPC ........................................................ 73/504.12

(58) Field of Classification Search
USPC ................ 73/504.12, 504.14, 504.02, 504.04
See application file for complete search history.

(56) References Cited

U.S. PATENT DOCUMENTS

| | | | | |
|---|---|---|---|---|
| 5,869,760 | A * | 2/1999 | Geen ........................... | 73/504.12 |
| 6,837,107 | B2 * | 1/2005 | Geen ........................... | 73/504.04 |
| 6,845,665 | B2 * | 1/2005 | Geen ........................... | 73/504.04 |
| 6,848,304 | B2 * | 2/2005 | Geen ........................... | 73/504.04 |
| 7,284,429 | B2 * | 10/2007 | Chaumet et al. ........... | 73/504.12 |
| 7,421,897 | B2 * | 9/2008 | Geen et al. .................. | 73/504.12 |
| 7,461,552 | B2 * | 12/2008 | Acar ........................... | 73/504.04 |
| 7,513,155 | B2 * | 4/2009 | Jeong et al. ................. | 73/504.02 |
| 7,558,157 | B1 | 7/2009 | Gardner et al. | |
| 8,096,181 | B2 * | 1/2012 | Fukumoto ................... | 73/504.12 |
| 8,250,916 | B2 * | 8/2012 | Jeong et al. ................. | 73/504.12 |
| 8,256,290 | B2 * | 9/2012 | Mao ............................ | 73/504.12 |
| 8,322,213 | B2 * | 12/2012 | Trusov et al. .............. | 73/504.12 |
| 8,342,023 | B2 * | 1/2013 | Geiger ........................ | 73/504.12 |
| 8,443,668 | B2 * | 5/2013 | Ohms et al. ................ | 73/504.12 |
| 8,459,110 | B2 * | 6/2013 | Cazzaniga et al. ......... | 73/504.12 |
| 8,534,127 | B2 * | 9/2013 | Seeger et al. ............... | 73/504.12 |
| 8,561,465 | B2 * | 10/2013 | Classen et al. ............. | 73/504.12 |
| 2007/0062282 | A1 * | 3/2007 | Akashi et al. .............. | 73/504.12 |
| 2007/0219751 | A1 | 9/2007 | Huang | |
| 2010/0281977 | A1 * | 11/2010 | Coronato et al. .......... | 73/504.14 |
| 2011/0004445 | A1 | 1/2011 | Borlee | |
| 2011/0030473 | A1 * | 2/2011 | Acar ........................... | 73/504.12 |
| 2011/0061460 | A1 * | 3/2011 | Seeger et al. ............... | 73/504.12 |
| 2012/0060604 | A1 * | 3/2012 | Neul et al. .................. | 73/504.12 |

FOREIGN PATENT DOCUMENTS

| | | |
|---|---|---|
| FR | 2 928 765 | 9/2009 |
| WO | WO 03/064975 | 8/2003 |

* cited by examiner

*Primary Examiner* — Helen Kwok
(74) *Attorney, Agent, or Firm* — Kenyon & Kenyon LLP

(57) ABSTRACT

A yaw-rate sensor includes: a substrate having a main extension plane for detecting a yaw rate about a first axis extending parallel to the main extension plane; a first Coriolis element; a second Coriolis element; a third Coriolis element; and a fourth Coriolis element. The first Coriolis element and the fourth Coriolis element are drivable in the same direction parallel to a second axis extending parallel to the main extension plane and perpendicularly to the first axis. The first Coriolis element and the second Coriolis element are drivable in opposite directions parallel to the second axis. The first Coriolis element and the third Coriolis element are drivable in opposite directions parallel to the second axis.

12 Claims, 8 Drawing Sheets

YAW-RATE SENSOR AND METHOD FOR OPERATING A YAW-RATE SENSOR

BACKGROUND OF THE INVENTION

1. Field of the Invention

The present invention relates to a yaw-rate sensor and a method for operating a yaw-rate sensor.

2. Description of the Related Art

Yaw-rate sensors are known from the related art. For example, a yaw-rate sensor having two oscillating mass elements is known from the published international patent application document WO 03064975 A1. Micromechanical yaw-rate sensors for yaw rates about an axis which is parallel to the sensor plane (Z' and yaw rate Qy) are normally designed as planarly oscillating masses or as masses rotating in the plane, which are subjected to a Coriolis force, which is perpendicular to the plane, when rotation occurs. This force is ascertained either via the electrostatic counterforce needed for position feedback regulation (closed-loop regulation) or, measured, for example, via the change in capacity due to the change in the distance to the substrate (open-loop operation). In addition to the setpoint measured variable, the Coriolis force, there are other forces that may act on the sensors and may induce a signal: linear acceleration and angular acceleration. The occurrence of these forces disadvantageously results in error signals during operation. With the aid of the differential evaluation of the forces which act on two masses moving in opposite directions, a distinction may be made between Coriolis force and the force due to linear acceleration (for example two masses oscillating toward each other or a mass rotating in a plane) for which the capacitance in two opposite positions is evaluated. Conventional sensors are insensitive to the angular acceleration about the y axis and also to the angular, acceleration about the z axis. Using conventional sensors, it is impossible to differentiate between Coriolis force and the force which arises due to the angular acceleration about the x axis. This limitation is extremely disadvantageous, since angular accelerations occur as interference variables.

It is therefore an object of the present invention to provide a yaw-rate sensor and a method for operating a yaw-rate sensor which do not have the disadvantages of the related art and are insensitive to angular accelerations.

BRIEF SUMMARY OF THE INVENTION

The yaw-rate sensor according to the present invention and the method according to the present invention have the advantage over the related art that they do not have the disadvantages of the related art and are insensitive to interfering, in particular angular accelerations. Furthermore, it is advantageously possible that, due to a differential evaluation, interfering linear accelerations and angular accelerations induce no, or at least only relatively weak, interference signals. These advantages are achieved according to the present invention by a yaw-rate sensor which has a substrate having a main plane of extension for detecting a yaw rate about a first axis extending parallel to the main plane of extension, the yaw-rate sensor having a first Coriolis element, a second Coriolis element, a third Coriolis element, and a fourth Coriolis element, the first Coriolis element and the fourth Coriolis element being drivable in the same direction parallel to a second axis extending parallel to the main plane of extension and perpendicularly to the first axis, the first Coriolis element and the second Coriolis element being drivable in opposite directions parallel to the second axis, and the first Coriolis element and the third Coriolis element being drivable in opposite directions parallel to the second axis.

According to one preferred refinement it is provided that the Coriolis elements are connected to each other via coupling elements, the coupling elements being preferably connected to the substrate. This makes it advantageously possible that the parallel interference modes with respect to the detection are shifted to high frequencies compared to the detection modes in opposite directions.

According to another preferred refinement it is provided that the coupling element has an axis of rotation parallel to the main plane of extension, the axis of rotation preferably running parallel to the first axis or to the second axis. This makes it advantageously possible that the parallel interference modes with respect to the detection are shifted to high frequencies compared to the detection modes in opposite directions.

According to another preferred refinement it is provided that the coupling element has a rocker structure, the rocker structure preferably having a symmetric mass distribution with respect to the axis of rotation. This makes it advantageously possible that the parallel interference modes with respect to the detection are shifted to high frequencies compared to the detection modes in opposite directions.

According to another preferred refinement it is provided that the Coriolis elements are coupled to a transformation means, the transformation means being coupled to a drive means, the transformation means being preferably coupled to the substrate, additional drive means being preferably provided, the drive means being furthermore preferably coupled to each other. This makes it advantageously possible that the parallel interference modes in the drive movement are shifted to high frequencies compared to the drive modes in opposite directions.

According to another preferred refinement it is provided that the transformation means has a quadrangular design, the transformation means preferably having L-shaped transformation means subelements. This makes it advantageously possible that the parallel interference modes in the drive movement are shifted to high frequencies compared to the drive modes in opposite directions.

Another subject matter of the present invention relates to a method for operating a yaw-rate sensor, in particular according to one of the above-mentioned specific embodiments, which has a substrate having a main plane of extension for detecting a yaw rate about a first axis extending parallel to the main plane of extension, a first Coriolis element and a fourth Coriolis element being driven in the same direction parallel to a second axis extending parallel to the main plane of extension and perpendicularly to the first axis, the first Coriolis element and a second Coriolis element being driven in opposite directions parallel to the second axis, the first Coriolis element and a third Coriolis element being driven in opposite directions parallel to the second axis.

According to one preferred refinement it is provided that the Coriolis elements are deflected parallel to a third axis which is perpendicular to the first axis and to the second axis, the Coriolis elements being preferably rotatably mounted, a first detection signal being generated by the deflection of the first Coriolis element, a second detection signal being generated by the deflection of the second Coriolis element, a third detection signal being generated by the deflection of the third Coriolis element, a fourth detection signal being generated by the deflection of the fourth Coriolis element; the first detection signal, the second detection signal, the third detection signal, and the fourth detection signal being preferably initially evaluated individually and subsequently jointly. This makes it advantageously possible that the method is insensitive to interfering, in particular rotational, accelerations. Furthermore, it is advantageously possible that linear accelerations and angular accelerations interfering with a differential evaluation induce no, or at least only relatively weak, interference signals.

According to another preferred refinement it is provided that the first detection signal and the fourth detection signal are added to form a first sum signal, the second detection signal and the third detection signal being added to form a second sum signal. This makes it advantageously possible that a differential evaluation may be performed in a simple manner. The signals may be combined via track conductors in the element or in the evaluation circuit.

Due to process asymmetries, the drive movement may overcouple into the detection movement. This effect, known as quadrature, may be advantageously compensated for by a quadrature compensation structure. Such a quadrature compensation structure may be preferably embodied as flat electrodes which change their overlap with the Coriolis elements with respect to the drive deflection.

According to another preferred refinement, stress relief structures are provided on the coupling elements. This advantageously shifts the non-linear area of the coupling elements to higher deflections.

According to another preferred refinement it is provided that a difference signal is formed from the first sum signal and the second sum signal, the yaw rate being determined as a function of the differential signal. This makes it advantageously possible that a differential evaluation may be performed in a simple manner.

DETAILED DESCRIPTION OF THE INVENTION

Figure 1:
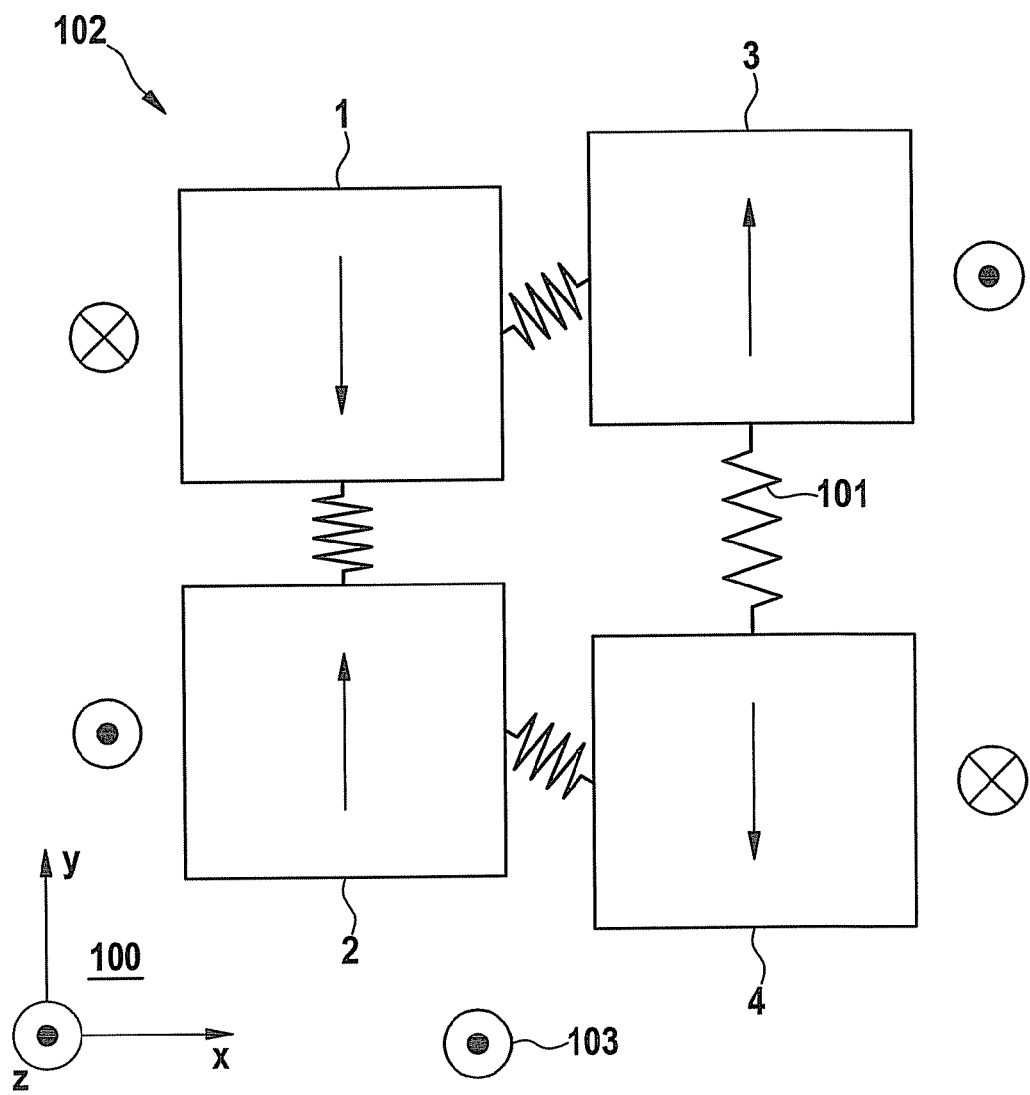
FIG. 1 shows a schematic illustration of an exemplary specific embodiment of yaw-rate sensor according to the present invention.

In the figures, identical parts are provided with identical reference numerals and are therefore normally named or mentioned only once.

FIG. 1 shows a schematic illustration of an exemplary specific embodiment of yaw-rate sensor 102 according to the present invention. Yaw-rate sensor 102 has four Coriolis elements 1, 2, 3, 4, which are designed as linearly oscillating masses (also referred to as hereinafter as partial oscillators or partial structures). A substrate (not illustrated) has a main plane of extension 100. Second axis (drive axis) Y is in main plane of extension 100. Drive means (not illustrated), which are preferably designed as comb structures, are provided for capacitively inducing oscillation of the Coriolis elements parallel to the second axis. Coriolis elements 1, 2, 3, 4 are connected to each other via coupling elements 101, which are preferably designed as rockers. The movements of the partial oscillators in the operation mode are indicated by the arrows. Partial oscillators 1, 4 and 2, 3 which are located diagonally opposite each other move in the drive mode (i.e., parallel to drive axis Y) in the same direction, so that Coriolis force 103 acts in the same direction on the masses located diagonally opposite each other due to a yaw rate about first axis X, and results in a deflection in the same direction of the masses located opposite each other, parallel to third axis Z.

Due to the drive movement, the Coriolis force causes a z movement in the same direction of partial structures 1, 4, and 2, 3. Electrodes (not illustrated) are located underneath each of the partial oscillators. The detection means (not illustrated) are preferably designed as capacitively measuring flat electrodes. Electrodes of 1 and 4 are connected together and electrodes of 2 and 3 are connected together. A net change in capacitance is obtained from the differential evaluation of capacitances (C1+C4)−(C2+C3), and the yaw rate is calculated therefrom.

Due to the drive movement and the wiring, as well as to the differential evaluation of capacitances (C(1+4)−C(2+3)), a signal is generated only for a yaw rate about the X axis. Linear accelerations and angular accelerations advantageously result in no signal.

In addition to the drive movement and detection movement, there are further interference modes which this sensor may execute and which may result in interference signals. By introducing special coupling structures between the partial oscillators, interference modes are suppressed in the sense that their frequency ranges are higher than those of the useful modes. These coupling structures have rocker structures or torsion bars, for example. This separation of useful modes and interference modes in the frequency range advantageously results in a lower excitation of the interference modes and thus in a stable operation. The separation of the antiparallel detection movement and the associated parallel interference modes are achieved by the rocker structures illustrated in FIGS. 2a-2d and FIG. 3, for example, whose torsion mode out of the plane is softer compared to the bending mode, and has thus a lower frequency.

Figure 2A:
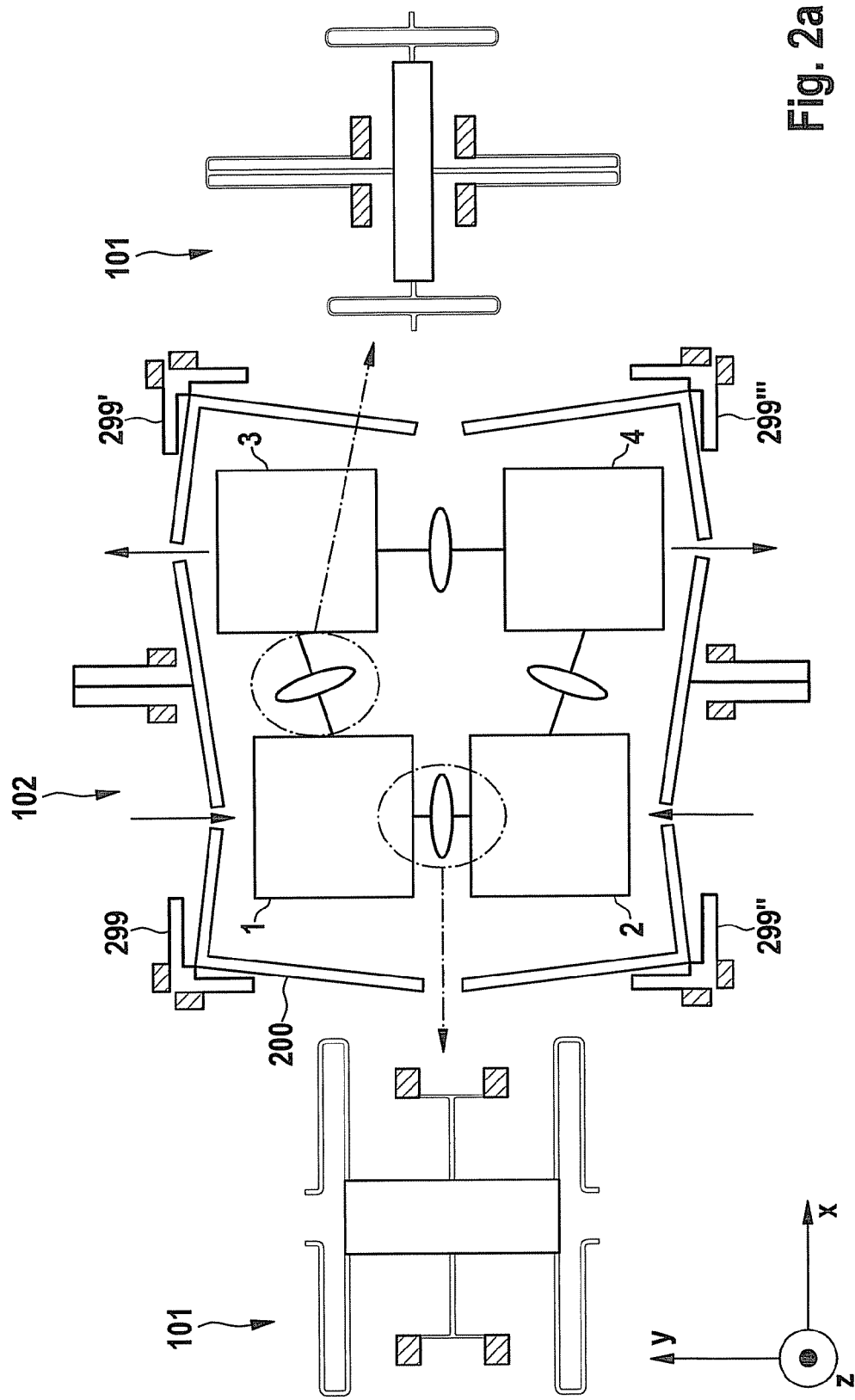
FIGS. 2a-2d show a schematic illustration of another exemplary specific embodiment of yaw-rate sensor according to the present invention.
Figure 2B:
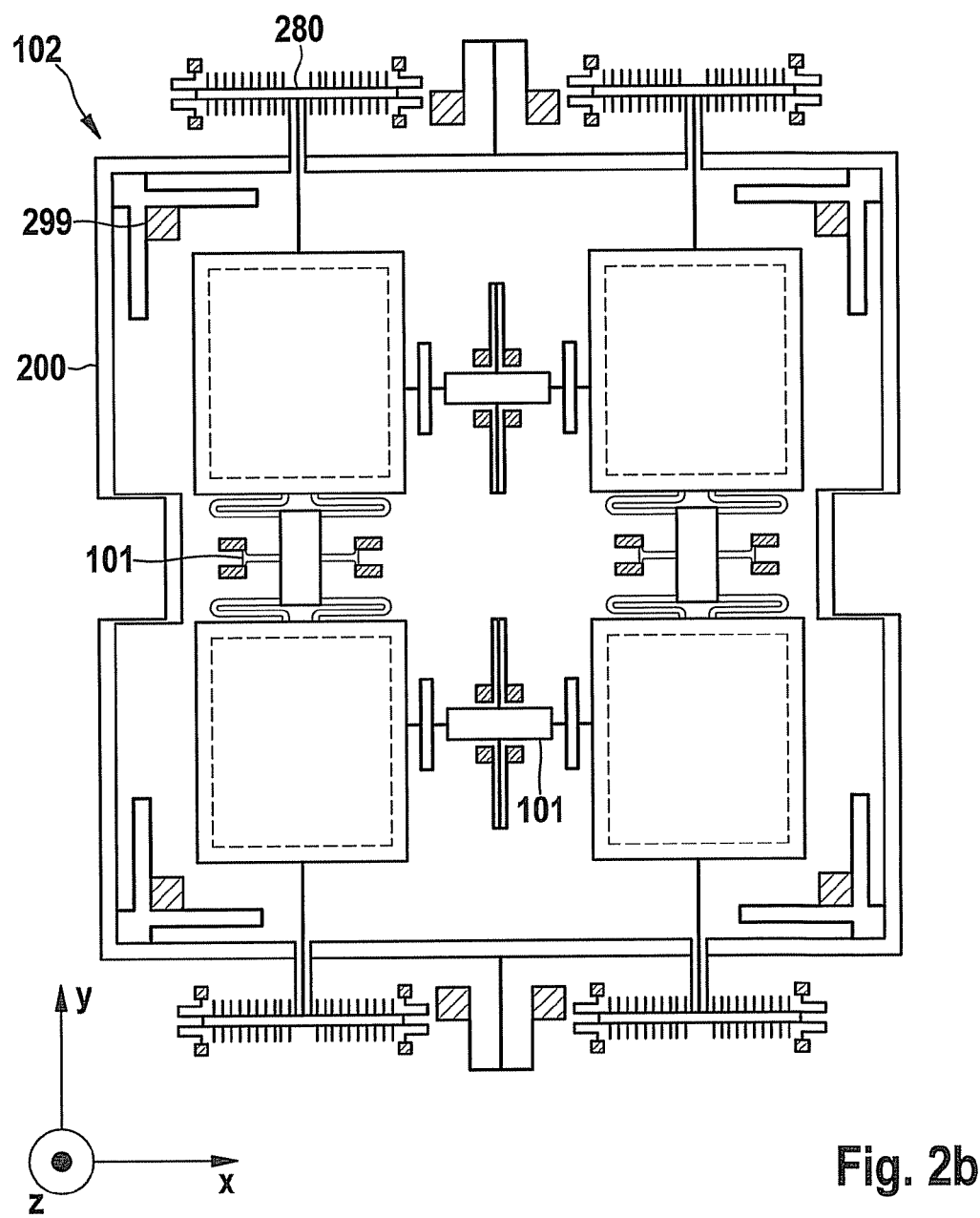
Figure 2D:
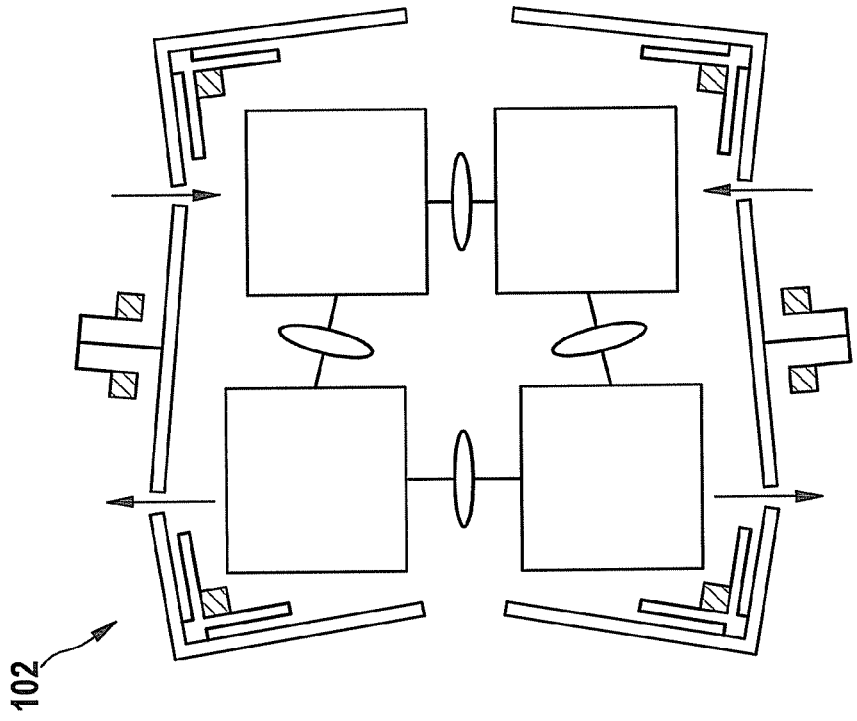
Figure 2C:
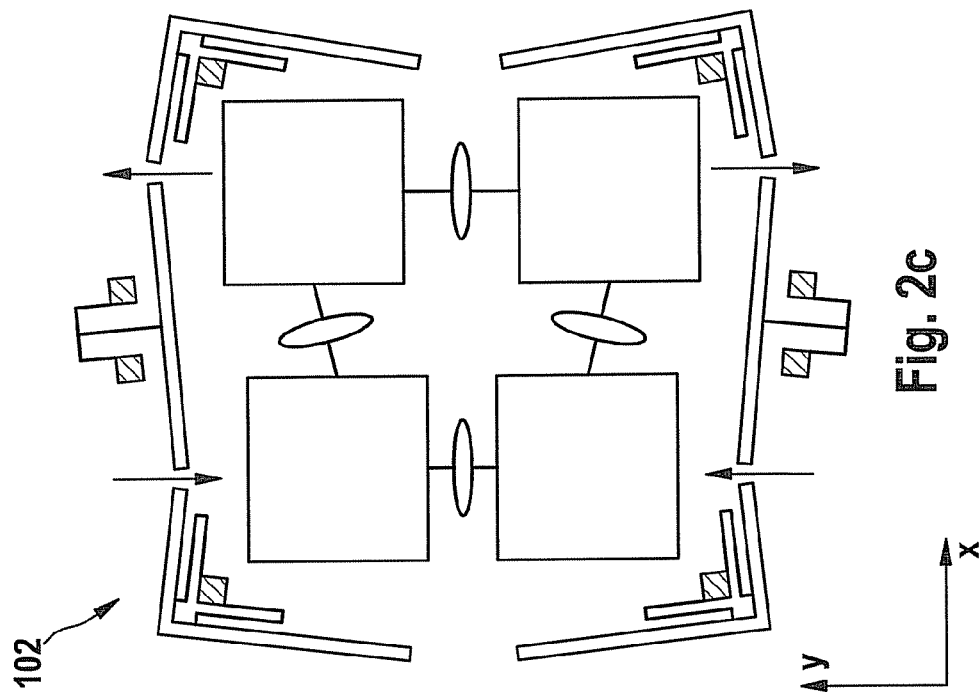

FIG. 2a shows another exemplary specific embodiment of yaw-rate sensor 102 according to the present invention. Yaw-rate sensor 102 has Coriolis elements 1, 2, 3, 4. Coriolis elements 1, 2, 3, 4 are connected to each other by coupling elements 101. Yaw-rate sensor 102 has a transformation means 200. Transformation means 200 is connected to the substrate via a corner spring 299. Additional corner springs 299', 299'', 299''' are situated on the other three corners of transformation means 200. Alternatively, the corner springs are situated between transformation means 200 and Coriolis elements 1, 2, 3, 4. Transformation means 200 preferably has angular or L-shaped partial structures. FIG. 2b shows yaw-rate sensor of FIG. 2a in the rest position. The Coriolis elements are excited to oscillations parallel to the y axis via drive structures 280. FIG. 2c shows the drive deflection in the positive y direction, and FIG. 2d shows the drive deflection in the negative y direction (the drive structures and the coupling of the frames are not illustrated).

Figure 3:
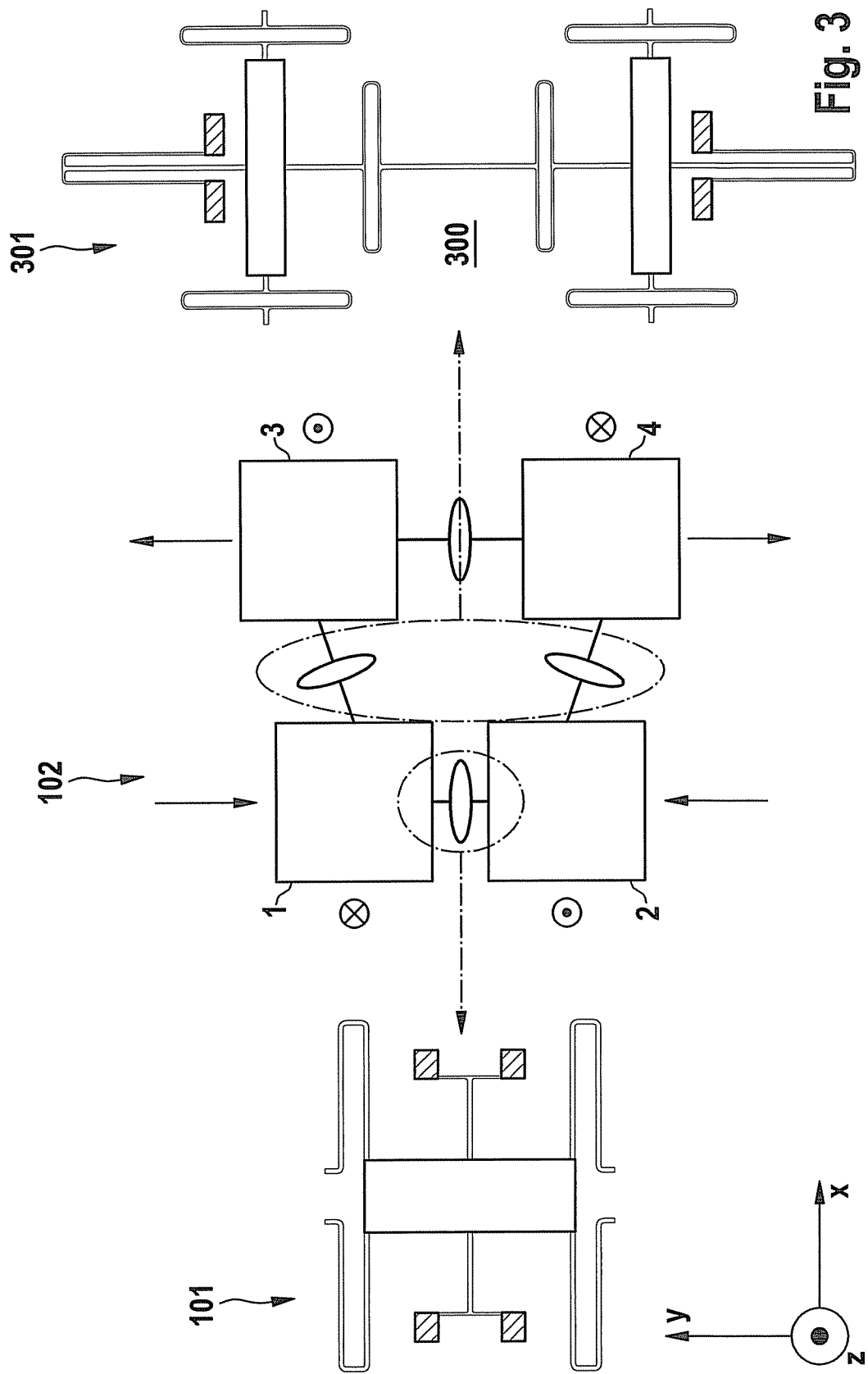
FIG. 3 shows a schematic illustration of another exemplary specific embodiment of yaw-rate sensor according to the present invention.

FIG. 3 shows another exemplary specific embodiment of yaw-rate sensor 102 according to the present invention. Yaw-rate sensor 102 has Coriolis elements 1, 2, 3, 4. Coriolis elements 1, 2, 3, 4 are connected to each other via coupling elements 101. Yaw-rate sensor 102 has a central coupling element 301, which has a torsion bar 300.

Figure 4A:
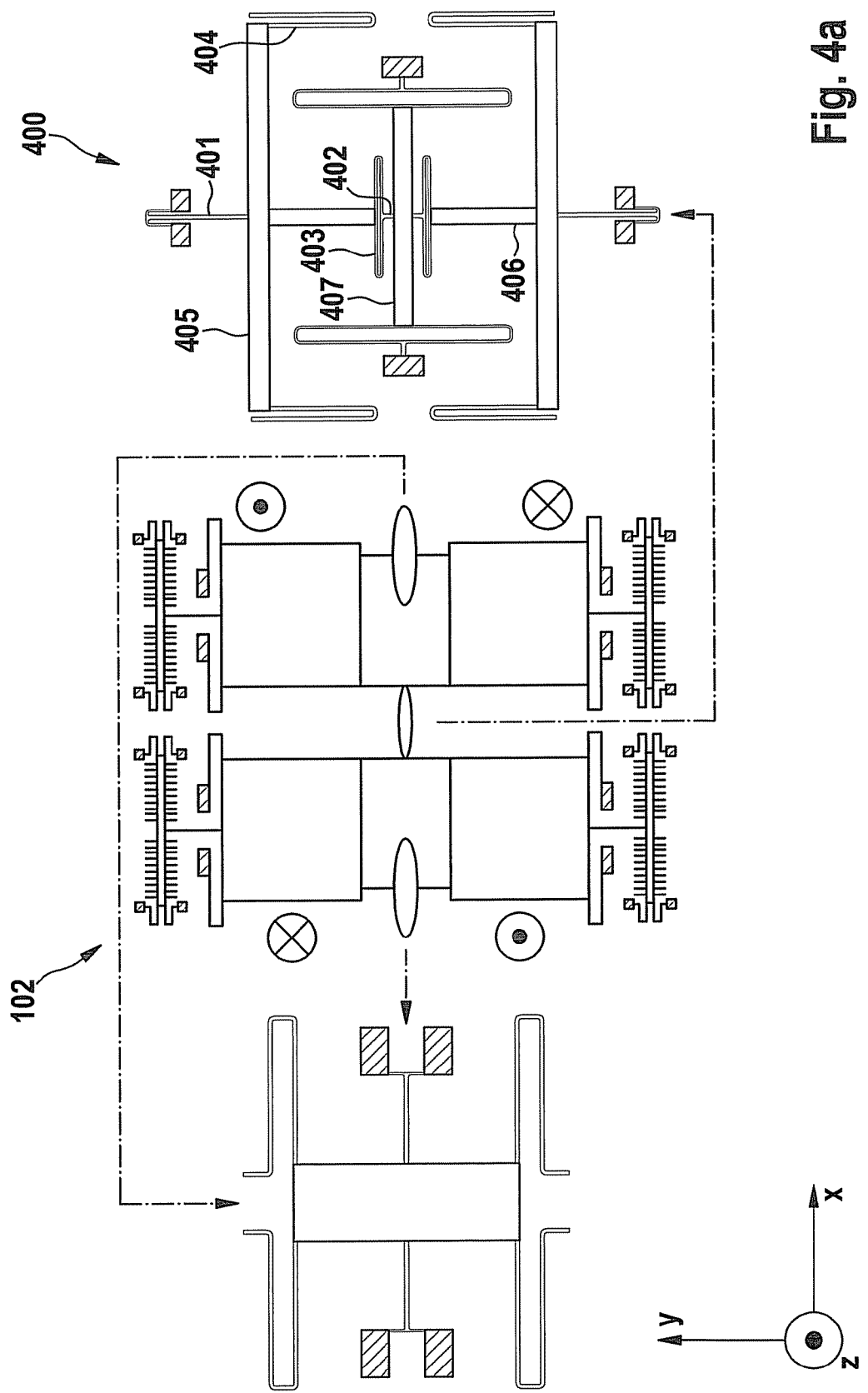
FIGS. 4a-4b show a schematic illustration of another exemplary specific embodiment of yaw-rate sensor according to the present invention.
Figure 4B:
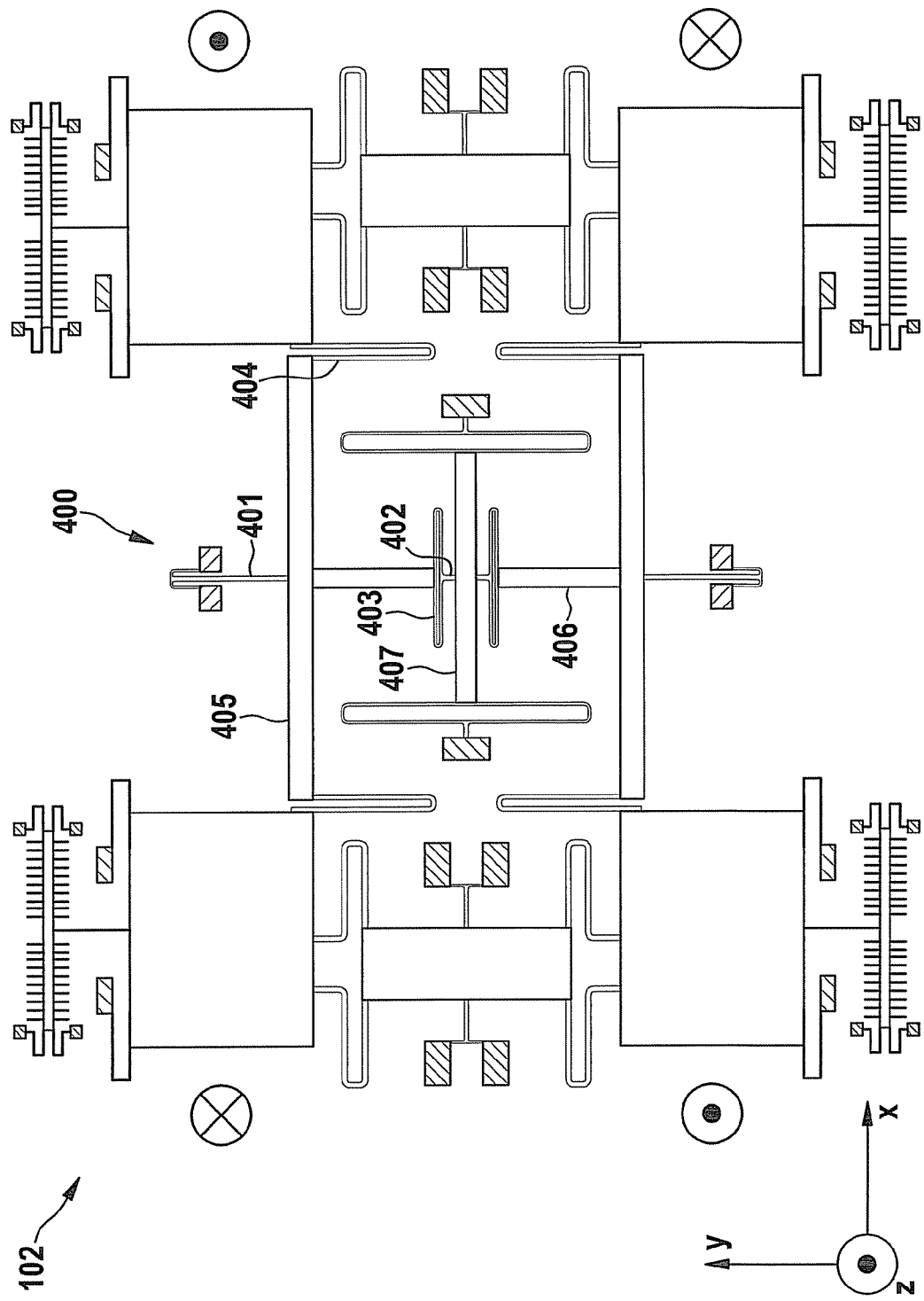

FIG. 4a shows another exemplary specific embodiment of yaw-rate sensor 102 according to the present invention. Yaw-rate sensor 102 has Coriolis elements 1, 2, 3, 4 and a central coupling element 400. This central element 400 has rigid elements 405, 406, and 407. Furthermore, central coupling element 400 has optional elastic elements 403 and 404, which are used for advantageously shifting the non-linear area of coupling element 400 to higher deflections. It furthermore has torsion bars 401 and 402. FIG. 4b shows the specific embodiment of FIG. 4a in another view.

Figure 5:
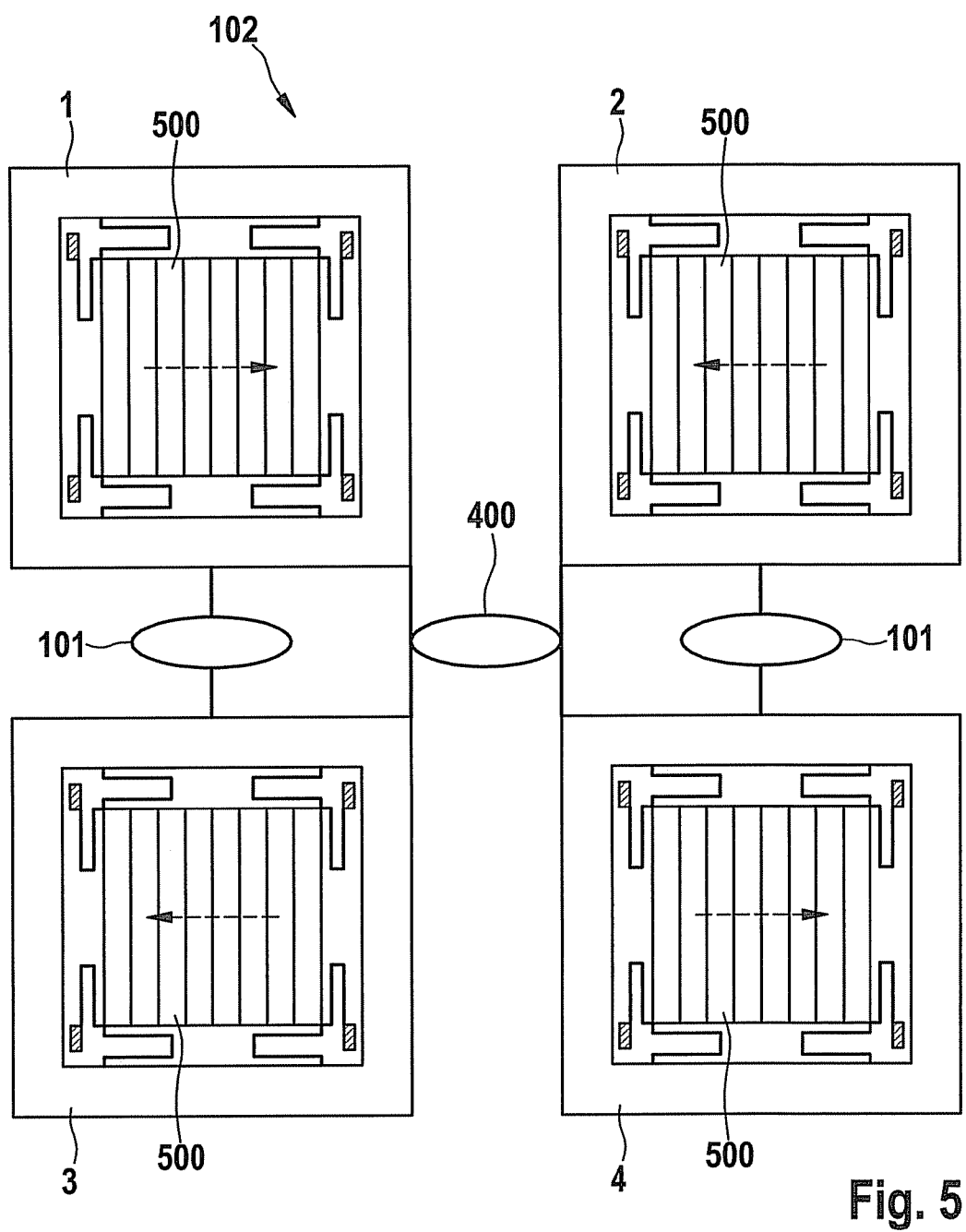
FIG. 5 shows a schematic illustration of another exemplary specific embodiment of yaw-rate sensor according to the present invention.

FIG. 5 shows another exemplary specific embodiment of yaw-rate sensor 102 according to the present invention. Yaw-rate sensor 102 additionally has, coupled to each Coriolis element, a detection structure 500 (webs) for deflections in the x direction. This detection structure 500 is deflected by a Coriolis force in the direction of detection (as indicated by the dashed arrows). In this way an x yaw rate and a z yaw rate may be advantageously measured.

A separation of the antiparallel drive movement and the associated parallel interference modes may be preferably suppressed by a surrounding frame (see FIGS. 2a-2d). The parallel interference modes with respect to the detection are shifted to high frequencies by the rocker-type structures. The parallel drive modes are shifted to higher frequencies by the frame. Alternatively or optionally, the same may be achieved with the aid of a rocker structure shown in FIG. 3, in whose center a bar 300 is rigid with respect to double bending (S-shaped bending), whereby the parallel drive mode is shifted to higher frequencies than is the antiparallel drive mode (simple bending of the bar). The parallel interference modes with respect to the detection are shifted to higher frequencies by the rocker-type structures. Torsion bar (300) is soft with respect to the detection modes (useful modes) in which the four partial oscillators oscillate crosswise antiparallel out of the plane. As an alternative to 301 or optionally, the same may be achieved with the aid of a coupling structure shown in FIGS. 4a, 4b in which the rigid elements (405, 406, T-shaped structure) prevent them from bending and are thus used for the preferred design of the above-described drive movement and shift the parallel drive modes to higher frequencies. The optional elastic elements (404, 403 and U-spring on 407) are used for advantageously shifting the non-linear area of the coupling element to higher deflections. Torsion bars 402, 401 are soft regarding torsion about their axis and rigid regarding a linear deflection in the direction perpendicular to the main plane of extension. The parallel detection modes are thereby advantageously shifted to higher frequencies. Optionally, yaw-rate sensor 102 may be equipped with counterweights for compensating for the torque decoupled from coupling structure 400.

Furthermore, one of the above structures having the same properties may be used for additionally measuring a yaw rate about the z axis by adding further detection structures to the Coriolis elements movable in the x, y, and z directions (for example specific embodiment in FIG. 5), which detect a deflection in the x direction. In the example shown, the x deflection of the Coriolis elements is transferred to the detection structures, which are rigid with respect to a deflection in the z direction. The deflection of the Coriolis elements in the z direction is detected, as in the above examples, with the aid of electrodes, for example, which are underneath the Coriolis elements (not shown).

Furthermore, the electrodes may be used for evaluating linear and angular accelerations, for example; via individual evaluation of the electrodes.

Micromechanical yaw-rate sensor structure 102 according to the present invention may be used in any yaw-rate sensors for rotations about an axis parallel to the sensor plane as used in the automotive industry (for example rollover sensing) or consumer electronics (for example game controllers, navigation).

What is claimed is:

1. A yaw-rate sensor, comprising:
   a substrate having a main plane of extension for detecting a yaw rate about a first axis extending parallel to the main plane of extension; and
   a first Coriolis element, a second Coriolis element, a third Coriolis element, and a fourth Coriolis element;
   a transformation unit coupled to a drive unit; and
   a corner spring connecting the transformation unit to the substrate
   wherein:
      the first Coriolis element and the fourth Coriolis element are configured to be driven in the same direction parallel to a second axis extending parallel to the main plane of extension and perpendicularly to the first axis;
      the first Coriolis element and the second Coriolis element are configured to be driven in opposite directions parallel to the second axis; and
      the first Coriolis element and the third Coriolis element are configured
   to be driven in opposite directions parallel to the second axis; and
   wherein the first, second, third, and fourth Coriolis elements are coupled to the transformation unit.

2. The yaw-rate sensor as recited in claim 1, wherein the third Coriolis element and the fourth Coriolis element are connected to each other via a coupling element, and wherein the coupling element is connected to the substrate.

3. The yaw-rate sensor as recited in claim 2, wherein the coupling element has an axis of rotation parallel to the main plane of extension, and wherein the axis of rotation extends parallel to one of the first axis or the second axis.

4. The yaw-rate sensor as recited in claim 2, wherein the coupling element has a rocker structure having a symmetric mass distribution with respect to the axis of rotation.

5. The yaw-rate sensor as recited in claim 2, wherein the coupling element is coupled to the substrate, and wherein the coupling element includes a bar which is soft with respect to torsion and rigid with respect to double bending.

6. The yaw-rate sensor as recited in claim 1, wherein the transformation unit has a quadrangular design and includes angular transformation sub-elements.

7. A method for operating a yaw-rate sensor including a first Coriolis element, a second Coriolis element, a third Coriolis element, a fourth Coriolis element, and a substrate having a main plane of extension for detecting a yaw rate about a first axis extending parallel to the main plane of extension, the method comprising:
   driving the first Coriolis element and the fourth Coriolis element in the same direction parallel to a second axis extending parallel to the main plane of extension and perpendicularly to the first axis;
   driving the first Coriolis element and the second Coriolis element in opposite directions parallel to the second axis; and
   driving the first Coriolis element and the third Coriolis element in opposite directions parallel to the second axis;
   wherein a transformation unit is coupled to a drive unit and a corner spring connects the transformation unit to the substrate; and
   wherein the first, second, third, and fourth Coriolis elements are coupled to the transformation unit.

8. The method as recited in claim 7, wherein the first through fourth Coriolis elements are deflected parallel to a third axis which is perpendicular to the first axis and the second axis, and wherein first through fourth detection signals are generated by the deflection of the first through fourth Coriolis elements, respectively, and wherein the first through fourth detection signals are evaluated.

9. The method as recited in claim 8, wherein the first detection signal and the fourth detection signal are added to form a first sum signal, and wherein the second detection signal and the third detection signal are added to form a second sum signal.

10. The method as recited in claim 9, wherein a difference signal is formed from the first sum signal and the second sum signal, and wherein the yaw rate is determined as a function of the difference signal.

11. The method as recited in claim 10, wherein the determined yaw rate is a yaw rate about at least one of the first axis and the third axis.

12. The yaw-rate sensor as recited in claim 6, wherein the quadrangular transformation unit has an L-shaped sub-element and is connected to the substrate at a corner of the L-shaped sub-element via the corner spring.

* * * * *